(12) United States Patent
Xu et al.

(10) Patent No.: US 10,380,065 B2
(45) Date of Patent: Aug. 13, 2019

(54) METHOD FOR ESTABLISHING A DIGITIZED INTERPRETATION BASE OF DONGBA CLASSIC ANCIENT BOOKS

(71) Applicant: Beijing Information Science & Technology University, Bejing (CN)

(72) Inventors: Xiaoli Xu, Bejing (CN); Guoxin Wu, Bejing (CN); Hongjun Wang, Beijing (CN); Ning Li, Beijing (CN); Zhanglei Jiang, Beijing (CN); Shaohong Wang, Beijing (CN)

(73) Assignee: Beijing Information Science & Technology University, Beijing (CN)

( * ) Notice: Subject to any disclaimer, the term of this patent is extended or adjusted under 35 U.S.C. 154(b) by 0 days.

(21) Appl. No.: 15/578,671

(22) PCT Filed: Jul. 18, 2016

(86) PCT No.: PCT/CN2016/090275
§ 371 (c)(1),
(2) Date: Nov. 30, 2017

(87) PCT Pub. No.: WO2017/193472
PCT Pub. Date: Nov. 16, 2017

(65) Prior Publication Data
US 2019/0057085 A1    Feb. 21, 2019

(30) Foreign Application Priority Data

May 10, 2016    (CN) .......................... 2016 1 0304529

(51) Int. Cl.
*G06F 16/00*    (2019.01)
*G06F 17/28*    (2006.01)
(52) U.S. Cl.
CPC .......... *G06F 16/00* (2019.01); *G06F 17/2827* (2013.01); *G06F 17/2872* (2013.01)

(58) Field of Classification Search
USPC .................................................. 704/277, 270
See application file for complete search history.

(56) References Cited

U.S. PATENT DOCUMENTS

| 5,664,227 | A | * | 9/1997 | Mauldin | ............... | G06F 16/739 |
| | | | | | | 715/203 |
| 5,835,667 | A | * | 11/1998 | Wactlar | ............... | G11B 27/034 |
| | | | | | | 386/241 |

FOREIGN PATENT DOCUMENTS

| CN | 102902809 A | | 1/2013 |
| CN | 2015-61900 B | * | 6/2015 |

(Continued)

OTHER PUBLICATIONS

International Patent Application No. PCT/CN2016/090275; Int'l Search Report; dated Feb. 8, 2017; 2 pages.

*Primary Examiner* — Marcus T Riley
(74) *Attorney, Agent, or Firm* — BakerHostetler

(57) ABSTRACT

The present invention relates to a method for establishing a digitalized interpretation base of Dongba classic ancient books, comprising the following steps: collecting existing Dongba classic ancient book information and establishing a Dongba classic ancient book interpretation information base, wherein the interpretation information base comprises a picture template base, an audio template base and a video template base; establishing a Dongba classic ancient book interpretation database according to the Dongba classic ancient book interpretation information base, wherein the interpretation database comprises a word meaning database, a sentence meaning database and an event database; establishing a Dongba classic ancient book interpretation knowledge base to perform management for the interpretation database: the interpretation knowledge base combining interpretation contents of the three types of interpretation databases according to interpretation rules, and utilizing an (Continued)

inference engine to promote fusion of the word meaning database, the sentence meaning database and the event database in the interpretation database; establishing a Dongba classic ancient book interpretation optimization base, performing frequent pattern mining and clustering analysis for contents of the interpretation database and the interpretation knowledge base through a knowledge mining tool to provide supports for the optimization and update of the interpretation rules of the interpretation database and the interpretation knowledge base.

8 Claims, 1 Drawing Sheet

(56) References Cited

FOREIGN PATENT DOCUMENTS

| | | | |
|---|---|---|---|
| CN | 104866607 A | * | 8/2015 |
| CN | 104866607 A | | 8/2015 |
| CN | 105224689 A | | 1/2016 |
| WO | WO 2015/029241 A | | 3/2015 |

* cited by examiner

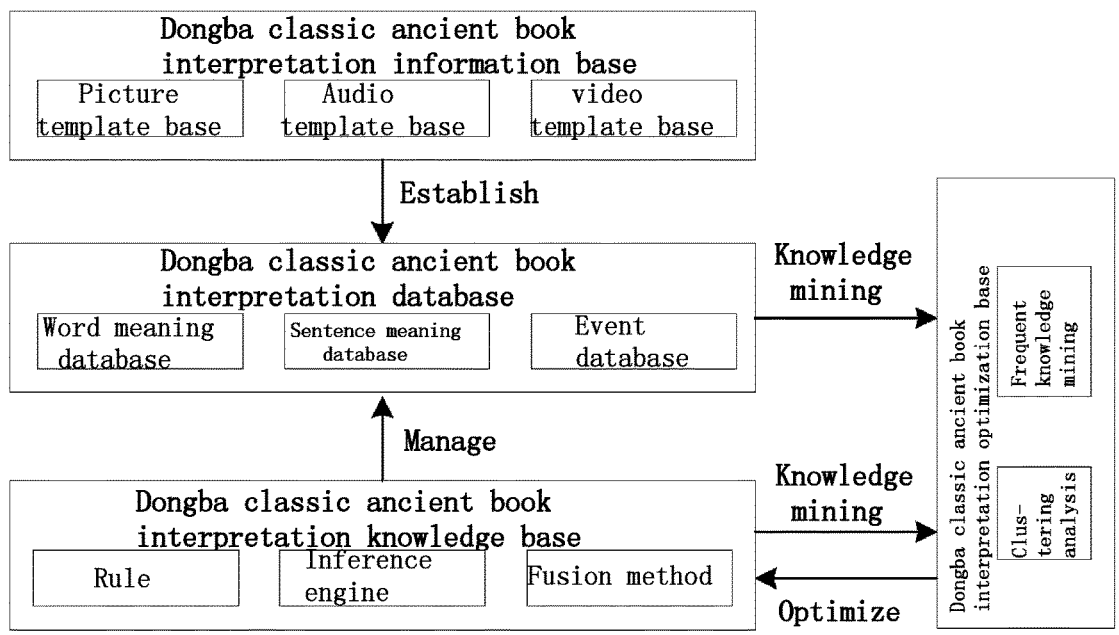

METHOD FOR ESTABLISHING A DIGITIZED INTERPRETATION BASE OF DONGBA CLASSIC ANCIENT BOOKS

FIELD OF THE INVENTION

The present invention relates to a method for establishing a digitalized interpretation base of characters, in particular to a method for establishing a digitalized interpretation base of Dongba classic ancient books for complex pictograph characters.

BACKGROUND OF THE INVENTION

Naxi nationality living in Southwest area of China is one minority of China. Dongba pictograph characters which have been being used by this nationality since ancient times are considered by the international academic circle as only pictograph characters which are still used nowadays in the world. Dongba classic ancient books were written by using Dongba pictograph characters having unique pictures and pronunciations, which were listed as "Memory of the World" by the United Nations Educational, Scientific and Cultural Organization in 2003, which established an important position of Dongba culture of Naxi nationality of China in the cultural development histories of the world and China.

Glyphs, pronunciations and meanings of Donga pictograph characters are extremely complex, one character often has multiple glyphs, multiple pronunciations and multiple meanings, and as well different characters have the same meaning. Since ancient times, inheritance of Dongba culture has been realized by means of oral teaching that inspires true understanding within in Dongba families. Now old Dongba hierophants who can interpret Dongba classic ancient books have already been over seventy years old. Interpretation of Dongba classic ancient books has obvious complexity and uncertainty in aspects of pictures, pronunciations and contents of pictograph characters, to which current recognition systems and translation systems such as for English and Chinese characters cannot be applicable.

SUMMARY OF THE INVENTION

For the above-mentioned problem, the purpose of the present invention is to provide a method for establishing a digitalized interpretation base of Dongba classic ancient books, which realizes digitized saving of Dongba classic ancient books and provides supports for the establishment and operation of Dongba classic ancient book databases and knowledge bases.

In order to realize the above-mentioned purpose, the present invention adopts the following technical solution: a method for establishing a digitized interpretation base of Dongba classic ancient books, characterized in that, the method comprises the following steps: 1) collecting existing Dongba classic ancient book information and establishing a Dongba classic ancient book interpretation information base, the interpretation information base comprises a picture template base, an audio template base and a video template base; 2) establishing a Dongba classic ancient book interpretation database according to the Dongba classic ancient book interpretation information base, the interpretation database comprises a word meaning database, a sentence meaning database and an event database; 3) establishing a Dongba classic ancient book interpretation knowledge base to perform management for the interpretation database: the interpretation knowledge base combining interpretation contents of the three types of interpretation databases according to interpretation rules, and utilizing an inference engine to promote fusion between the word meaning database, the sentence meaning database and the event database in the interpretation database; and 4) establishing a Dongba classic ancient book interpretation optimization base, performing frequent pattern mining and clustering analysis for contents of the interpretation database and the interpretation knowledge base through a knowledge mining tool to provide supports for the optimization and update of the interpretation rules of the interpretation database and the interpretation knowledge base.

In one preferred embodiment, in the step 1), the picture template base includes unique picture codes, standard glyphs and special-shaped characters, wherein picture contents in the picture template base include Dongba pictograph characters, Dongba statements and Dongba events; the audio template base includes unique audio codes, audio storage paths and Naxi phonetic symbols, wherein audio contents in the audio template base also include Dongba characters, Dongba statements and Dongba events; the video template base includes unique video codes and video storage paths, wherein video contents in the video template base also include Dongba characters, Dongba statements and Dongba events.

In one preferred embodiment, in the step 2), for the word meaning database, extracting Dongba pictograph characters in existing Dongba classics as standard type matrixes, coding each character by adopting Unicode, and establishing a Dongba pictograph character standard template base by utilizing an existing TrueType method; tidying and entering existing interpretation information of characters in the Dongba pictograph character standard template base; fields of the word meaning database include word meaning codes Unicode, picture codes, corresponding Chinese characters, categories, corresponding English, interpreters, Chinese meanings, audio codes, Naxi phonetic symbols and video codes; the sentence meaning database includes sentence meaning codes, Dongba statements, corresponding Chinese, statement meanings, categories, picture codes, audio codes and video codes; the event database includes event name codes, event names, categories, event contents, picture codes, audio codes and video codes, wherein content categories include philosophy, history, religion, medicine, astronomy, geography, folkway, animal and plant, military, literature and art.

In one preferred embodiment, in the step 3), the interpretation rules are as follows: 3.1) S is defined as a rule set, $C=\{C1, C2 \ldots Cn\}$ is defined as a condition attribute set, $V=(Vc1, Vc2 \ldots Vcn)$ is defined as a value range of condition attributes and decision attributes, D is defined as a decision attribute set, (d1, d2, d3 ... dv) is defined as a decision value; 3.2) the rules are: if an input condition attribute C1 is a certain value Vc1 in the value range V, the decision attribute D is a corresponding decision value d1, i.e., attributes corresponding to corresponding fields when output meets Vc1; if two condition attributes C2 and C3 are input, wherein C2 is a certain value Vc2 in the value range V, C3 is a certain value Vc3 in the value range V, the decision attribute D is a decision value d2, i.e., attributes corresponding to corresponding fields when output meets Vc2 and Vc3.

In one preferred embodiment, in the step 3), a process performed by the inference engine is as follows: (1) matching: whether a fact related to a current problem to be solved in the interpretation database is matched with a condition for a rule in the interpretation knowledge base, if yes, enabling the rule in the interpretation knowledge base, entering step (3) to perform according to an execution operation of the rule; if there are conditions for a plurality of rules simultaneously which are matched with the fact related to the problem to be solved, entering step (2); (2) conflict elimination: presetting priorities for conditions for all rules, when there are conditions for a plurality of rules which are matched with the fact related to the problem to be solved, preferentially enabling the rule corresponding to the condition with a higher priority; (3) operation execution: executing an operation of the enabled rule, obtaining a new fact after the operation is executed, putting the obtained new fact into the current interpretation database.

In one preferred embodiment, in the step 3), a method for fusing the word meaning database, the sentence meaning database and the event database comprises the following steps: (1) uniquely determining one Dongba character according to a word meaning database code, synchronously searching out a picture, an audio and a video corresponding to the Dongba character according to a picture code, an audio code and a video code of the Dongba character, presenting a content and a meaning of the Dongba character; (2) fuzzily retrieving the sentence meaning database according to the corresponding Chinese character and the category in the word meaning database to search out a Dongba statement which meets the same category, i.e., matching out a Dongba statement according to the single Dongba character, so as to search out a picture, an audio and a video corresponding to the Dongba statement according to a picture code, an audio code and a video code in the sentence meaning database; (3) fuzzily retrieving the event database according to the corresponding Chinese character and the category in the word meaning database to search out a Dongba event name which meets the same category, i.e., matching out a Dongba event according to the single Dongba character, so as to search out a picture, an audio and a video corresponding to the Dongba event according to a picture code, an audio code and a video code in the event database, thereby realizing the fusion of the word meaning database, the sentence meaning database and the event database.

In one preferred embodiment, in the step 4), a process of frequent pattern mining is as follows: performing frequent pattern mining for the word meaning database, the sentence meaning database and the event database in the interpretation database to obtain word meaning combinations and sentence meaning combinations which are frequently used in the word meaning database, the sentence meaning database and the event database; performing frequent pattern mining for the rules in the interpretation knowledge base, generalizing combinations of condition attributes and decision values which are frequently used; outputting frequent items to the interpretation knowledge base, providing word meaning combinations and sentence meaning combinations which are the most matched with a current interpreted statement in an interpretation process of a Dongba pictograph character as interpretation options for selection; by taking the word meaning database as an example, frequent pattern mining is performed by adopting an FP-growth algorithm as follows: (1) scanning the word meaning database, finding out frequently used word meanings and use times, making a list L of frequent items, ranking the frequent items in a progressive decrease order according to the use times; (2) scanning the database again, continuously constructing an FP-Tree from each word meaning: setting a root node of the FP-Tree as null; adding each word meaning item to branches of the FP-Tree one by one; (3) making a head node list, linking all same items together; (4) finding out a path ended with a certain word meaning, i.e., a suffix pattern of a word meaning, according to the head node list; (5) a prefix path of the word meaning forming a conditional pattern base of the word meaning; (6) constructing a conditional FP-tree of the word meaning according to the conditional pattern base to obtain a conditional frequent item set; (7) merging the conditional frequent item set with the suffix pattern of the word meaning to obtain a frequent item set of the word meaning.

In one preferred embodiment, in the step 4), a method for clustering analysis is as follow: (1) using a number of events in the event database as a category number of clustering analysis, using information about event codes, event names, categories, event contents and picture codes as source data, calculating clustering centers of events by adopting a fuzzy C-means method; (2) using information about word meaning codes, picture codes, corresponding characters, categories and Chinese meanings in the word meaning database corresponding to two continuous word meanings in an interpretation process as samples, calculating a membership degree that the samples belong to a certain clustering center; (3) using an event corresponding to the membership degree with the maximum numerical value as an implicit event of the word meaning, outputting an association relationship between word meanings and events to the interpretation knowledge base to improve the fusion method in the interpretation knowledge base.

Since the above-mentioned technical solution is adopted, the present invention has the following advantages: 1) by establishing the Dongba classic ancient book information base, the present invention realizes the digitized saving of Dongba classic ancient books and provides supports for the establishment and operation of Dongba classic ancient book databases and knowledge bases; 2) the Dongba classic ancient book interpretation base established by the present invention can realize synchronous search of pictures, audios and videos of complex pictograph characters, can provide internally associated information such as word meanings, sentence meanings and events of complex pictograph characters, and can provide helps in solving problems of interpretation complexity and implicitly of Dongba classic ancient books; 3) the Dongba classic ancient book interpretation base established by the present invention has a self-learning capability, the optimization of interpretation rules can be realized by continuously mining information and the accuracy of interpretation is improved.

DESCRIPTION OF THE DRAWINGS

FIG. 1 illustrates an overall flowchart diagram of the present invention.

DESCRIPTION OF THE PREFERRED EMBODIMENTS

The present invention will be described below in detail with reference to the drawings in combination with the embodiments.

As illustrated in FIG. 1, the present invention provides a method for establishing a digitalized interpretation base of Dongba classic ancient books, comprising the following steps:

1) Existing Dongba classic ancient book information is collected and a Dongba classic ancient book interpretation information base is established, wherein the interpretation information base comprises a picture template base, an audio template base and a video template base.

The picture template base is obtained by performing digitalized entry and image processing for Dongba classic ancient book information pictures collected by a non-contact ancient book scanner and a professional digital camera and saving the processed pictures as JPG format files. The picture template base includes unique picture codes, standard glyphs (JPG) and special-shaped characters (JPG), wherein picture contents in the picture template base include Dongba pictograph characters, Dongba statements and Dongba events.

The audio template base is obtained by editing high sampling digital frequency audio resources acquired by a digital recording device by adopting audio editing software and saving the processed audio resources as mp3 format files, wherein high sampling frequency is 320 kb/s. The audio template base includes unique audio codes, audio storage paths (Naxi pronunciations) and Naxi phonetic symbols, wherein audio contents in the audio template base also include Dongba characters, Dongba statements and Dongba events.

The video template base is obtained by editing collected Dongba classic ancient book information video resources, loading explanation audios, explanation captions or background music and saving the processed video resources as wmv format files. The video template base includes unique video codes and video storage paths (video contents include songs, dances, sacrificial rites and the like), wherein video contents in the video template base also include Dongba characters, Dongba statements and Dongba events.

2) A Dongba classic ancient book interpretation database is established according to the Dongba classic ancient book interpretation information base, wherein the interpretation database comprises a word meaning database, a sentence meaning database and an event database.

For the word meaning database, Dongba pictograph characters in existing Dongba classics (such as "Naxi Pictograph Character Chart" by Fang Guoyu) are extracted as standard type matrixes (字模), each character is coded by adopting Unicode and a Dongba pictograph character standard template base is established by utilizing an existing TrueType method; and existing interpretation information of characters in the Dongba pictograph character standard template base is tidied and entered.

Fields of the word meaning database include word meaning codes (Unicode) (word meaning codes are primary keys), picture codes (PId), corresponding Chinese characters (Chinese), categories (Category), corresponding English (English), interpreters (Interpreter), Chinese meanings (Translation), audio codes (AId), Naxi phonetic symbols (NaxiP) and video codes (VId), as shown in Table 1.

TABLE 1

| Fields of word meaning database | | | | | | | |
|---|---|---|---|---|---|---|---|
| Unicode | Category | Chinese | English | Interpreter | Translation | NaxiP | ... |
| E900 | Celestial phenomena | 天 | Sky | Li Lifen | 圓而覆也 | mux-1 | ... |

The sentence meaning database includes sentence meaning codes, Dongba statements, corresponding Chinese, statement meanings, categories, picture codes, audio codes and video codes.

The event database includes event name codes, event names, categories, event contents, picture codes, audio codes and video codes, wherein content category includes philosophy, history, religion, medicine, astronomy, geography, folkway, animal and plant, military, literature and art.

3) A Dongba classic ancient book interpretation knowledge base is established to perform management to the interpretation database: the interpretation knowledge base combines interpretation contents of the three types of interpretation databases according to interpretation rules, and utilizes an inference engine to promote fusion of the word meaning database, the sentence meaning database and the event database in the interpretation database.

3.1) The interpretation rules are as follows:

3.1.1) S is defined as a rule set, $C=\{C1, C2 \ldots Cn\}$ is defined as a condition attribute set, $V=(Vc1, Vc2 \ldots Vcn)$ is defined as a value range of condition attributes and decision attributes, D is defined as a decision attribute set and $(d1, d2, d3 \ldots dv)$ is defined as a decision value.

3.1.2) the rules are: if an input condition attribute C1 is a certain value Vc1 in the value range V, the decision attribute D is a corresponding decision value d1, i.e., attributes corresponding to corresponding fields when output meets Vc1; if two condition attributes C2 and C3 are input, wherein C2 is a certain value Vc2 in the value range V and C3 is a certain value Vc3 in the value range V, the decision attribute D is a decision value d2, i.e., attributes corresponding to corresponding fields when output meets Vc2 and Vc3.

For example, when the input condition attribute C1 is a 'word meaning code' attribute, a judgement is made according to the rule, if Vc1=E900, D is d1, and information about attributes corresponding to corresponding fields, such as 'Category' is celestial phenomena, 'Chinese' is 天, is output, as shown in the following table.

| E900 | Celestial phenomena | 天 | Sky | Li Lifen | 圓而覆也 | mux-1 | ... |
|---|---|---|---|---|---|---|---|

3.2) A process performed by the inference engine is as follows:

(1) matching: whether a fact related to a current problem to be solved in the interpretation database is matched with a condition for a rule in the interpretation knowledge base, if yes, the rule in the interpretation knowledge base is enabled, and step (3) is proceeded to perform according to an execution operation of the rule; if there are conditions for a plurality of rules simultaneously which are matched with the fact related to the problem to be solved, step (2) is proceeded;

(2) conflict elimination: priorities are preset for conditions for all rules, that is, the priority in the value range V is: Vc1>Vc2> . . . >Vcn, when there are conditions for a plurality of rules which are matched with the fact related to the problem to be solved, the rule corresponding to the condition with a higher priority is preferentially enabled;

(3) operation execution: an operation of the enabled rule is executed, a new fact is obtained after the operation is executed, the obtained new fact is put into the current interpretation database.

3.3) A method for fusing the word meaning database, the sentence meaning database and the event database comprises the following steps:

(1) one Dongba character is uniquely determined according to a word meaning database code, a picture, an audio and a video corresponding to the Dongba character are synchronously searched out according to a picture code, an audio code and a video code of the Dongba character, a content and a meaning of the Dongba character are present;

(2) the sentence meaning database is fuzzily retrieved according to a corresponding Chinese character and a category in the word meaning database to search out a Dongba statement which meets the same category, i.e., a Dongba statement is matched out according to the single Dongba character, so as to search out a picture, an audio and a video corresponding to the Dongba statement according to a picture code, an audio code and a video code in the sentence meaning database;

(3) the event database is fuzzily retrieved according to the corresponding Chinese character and the category in the word meaning database to search out a Dongba event name which meets the same category, i.e., a Dongba event is matched out according to the single Dongba character, so as to search out a picture, an audio and a video corresponding to the Dongba event according to a picture code, an audio code and a video code in the event database, thereby realizing the fusion of the word meaning database, the sentence meaning database and the event database.

4) A Dongba classic ancient book interpretation optimization base is established, frequent pattern mining and clustering analysis are performed for contents of the interpretation database and the interpretation knowledge base through a knowledge mining tool to provide supports for the optimization and update of the interpretation rules of the interpretation database and the interpretation knowledge base.

4.1) A process of frequent pattern mining is as follows: frequent pattern mining is performed for the word meaning database, the sentence meaning database and the event database in the interpretation database to obtain word meaning combinations and sentence meaning combinations which are frequently used in the word meaning database, the sentence meaning database and the event database; frequent pattern mining is performed for the rules in the interpretation knowledge base, combinations of condition attributes and decision values frequently used are generalized. Frequent items are output to the interpretation knowledge base, word meaning combinations and sentence meaning combinations that are the most matched with a current interpreted statement are provided as interpretation options for selection in an interpretation process of a Dongba pictograph character.

By taking the word meaning database as an example, frequent pattern mining is described by adopting an FP-growth algorithm as follows:

(1) the word meaning database is scanned, frequently used word meanings and use times are found out, a list L of frequent items is made, the frequent items are ranked in a progressive decrease order according to the use times;

(2) the database is scanned again, an FP-Tree is continuously constructed from each word meaning: a root node of the FP-Tree is set as null; each word meaning item is added to branches of the FP-Tree one by one;

(3) a head node list is made and all the same items are linked together;

(4) a path ended with a certain word meaning, i.e., a suffix pattern of a word meaning, is found out according to the head node list;

(5) a prefix path of the word meaning forms a conditional pattern base of the word meaning;

(6) a conditional FP-tree of the word meaning is constructed according to the conditional pattern base to obtain a conditional frequent item set;

(7) the conditional frequent item set is merged with the suffix pattern of the word meaning to obtain a frequent item set of the word meaning.

4.2) A method for clustering analysis is as follows:

(1) a number of events in the event database is used as a category number of clustering analysis, information about event codes, event names, categories, event contents and picture codes is used as source data, clustering centers of events are calculated by adopting a fuzzy C-means method;

(2) information about word meaning codes, picture codes, corresponding characters, categories, Chinese meanings and so on in the word meaning database corresponding to two continuous word meanings in an interpretation process is used as samples, a membership degree that the samples belong to a certain clustering center is calculated;

(3) an event corresponding to the membership degree with the maximum numerical value is used as an implicit event of the word meaning, an association relationship between word meanings and events is output to the interpretation knowledge base to improve the fusion method in the interpretation knowledge base.

The above-mentioned embodiments are only used for describing the present invention. Structure, size, arrangement position and shape of all components may be varied. Improvements and equivalent replacements made to individual components according to the principle of the present invention on the basis of the technical solution of the present invention shall be all included in the protection scope of the present invention.

The invention claimed is:

1. A method for establishing a digitalized interpretation base of Dongba classic ancient books, characterized in that, the method comprises the following steps:

1) collecting existing Dongba classic ancient book information and establishing a Dongba classic ancient book interpretation information base, wherein the interpretation information base comprises a picture template base, an audio template base and a video template base;

2) establishing a Dongba classic ancient book interpretation database according to the Dongba classic ancient book interpretation information base, wherein the interpretation database comprises a word meaning database, a sentence meaning database and an event database;

3) establishing a Dongba classic ancient book interpretation knowledge base to perform management for the interpretation database: the interpretation knowledge base combining interpretation contents of the three types of interpretation databases according to interpretation rules, and utilizing an inference engine to promote fusion of the word meaning database, the sentence meaning database and the event database in the interpretation database;

4) establishing a Dongba classic ancient book interpretation optimization base, performing frequent pattern mining and clustering analysis for contents of the interpretation database and the interpretation knowledge base through a knowledge mining tool to provide supports for optimization and update of the interpretation rules of the interpretation database and the interpretation knowledge base.

2. The method for establishing a digitalized interpretation base of Dongba classic ancient books according to claim 1, characterized in that: in the step 1), the picture template base includes unique picture codes, standard glyphs and special-shaped characters, wherein picture contents in the picture template base include Dongba pictograph characters, Dongba statements and Dongba events; the audio template base includes unique audio codes, audio storage paths and Naxi phonetic symbols, wherein audio contents in the audio template base also include Dongba characters, Dongba statements and Dongba events; the video template base includes unique video codes and video storage paths, wherein video contents in the video template base also include Dongba characters, Dongba statements and Dongba events.

3. The method for establishing a digitalized interpretation base of Dongba classic ancient books according to claim 1, characterized in that: in the step 2), for the word meaning database: extracting Dongba pictograph characters in existing Dongba classics as standard type matrixes, coding each character by adopting Unicode, and establishing a Dongba pictograph character standard template base by utilizing an existing TrueType method; tidying and entering existing interpretation information of characters in the Dongba pictograph character standard template base; fields of the word meaning database include word meaning codes Unicode, picture codes, corresponding Chinese characters, categories, corresponding English, interpreters, Chinese meanings, audio codes, Naxi phonetic symbols and video codes; the sentence meaning database includes sentence meaning codes, Dongba statements, corresponding Chinese, statement meanings, categories, picture codes, audio codes and video codes; and the event database includes event name codes, event names, categories, event contents, picture codes, audio codes and video codes, wherein content categories includes philosophy, history, religion, medicine, astronomy, geography, folkway, animal and plant, military, literature and art.

4. The method for establishing a digitalized interpretation base of Dongba classic ancient books according to claim 1, characterized in that: in the step 3), the interpretation rules are as follows:
   3.1) S is defined as a rule set, C={C1, C2 . . . Cn} is defined as a condition attribute set, V=(Vc1, Vc2 . . . Vcn) is defined as a value range of condition attributes and decision attributes, D is defined as a decision attribute set, (d1, d2, d3 . . . dv) is defined as a decision value;
   3.2) the rules are: if an input condition attribute C1 is a certain value Vc1 in the value range V, the decision attribute D is a corresponding decision value d1, i.e., attributes corresponding to corresponding fields when output meets Vc1; if two condition attributes C2 and C3 are input, wherein C2 is a certain value Vc2 in the value range V, C3 is a certain value Vc3 in the value range V, the decision attribute D is a decision value d2, i.e., attributes corresponding to corresponding fields when output meets Vc2 and Vc3.

5. The method for establishing a digitalized interpretation base of Dongba classic ancient books according to claim 1, characterized in that: in the step 3), a process performed by the inference engine is as follows:
   (1) matching: whether a fact related to a current problem to be solved in the interpretation database is matched with a condition for a rule in the interpretation knowledge base, if yes, enabling the rule in the interpretation knowledge base, entering step (3) to perform according to an execution operation of the rule; if there are conditions for a plurality of rules simultaneously which are matched with the fact related to the problem to be solved, entering step (2);
   (2) conflict elimination: presetting priorities for conditions of all rules, when there are conditions for a plurality of rules which are matched with the fact related to the problem to be solved, preferentially enabling the rule corresponding to the condition with a higher priority;
   (3) operation execution: executing an operation of the enabled rule, obtaining a new fact after the operation is executed, putting the obtained new fact into the current interpretation database.

6. The method for establishing a digitalized interpretation base of Dongba classic ancient books according to claim 1, characterized in that: in the step 3), a method for fusing the word meaning database, the sentence meaning database and the event database comprises the following steps:
   (1) uniquely determining one Dongba character according to a word meaning database code, synchronously searching out a picture, an audio and a video corresponding to the Dongba character according to a picture code, an audio code and a video code of the Dongba character, presenting a content and a meaning of the Dongba character;
   (2) fuzzily retrieving the sentence meaning database according to a corresponding Chinese character and a category in the word meaning database to search out a Dongba statement which meets the same category, i.e., matching out a Dongba statement according to the single Dongba character, so as to search out a picture, an audio and a video corresponding to the Dongba statement according to a picture code, an audio code and a video code in the sentence meaning database;
   (3) fuzzily retrieving the event database according to the corresponding Chinese character and the category in the word meaning database to search out a Dongba event name which meets the same category, i.e., matching out a Dongba event according to the single Dongba character, so as to search out a picture, an audio and a video corresponding to the Dongba event according to a picture code, an audio code and a video code in the event database, thereby realizing the fusion of the word meaning database, the sentence meaning database and the event database.

7. The method for establishing a digitalized interpretation base of Dongba classic ancient books according to claim 1, characterized in that: in the step 4), a process of frequent pattern mining is as follows: performing frequent pattern mining for the word meaning database, the sentence meaning database and the event database in the interpretation database to obtain word meaning combinations and sentence meaning combinations which are frequently used in the word meaning database, the sentence meaning database and the event database; performing frequent pattern mining for the rules in the interpretation knowledge base, generalizing combinations of condition attributes and decision values which are frequently used; outputting frequent items to the interpretation knowledge base, providing word meaning combinations and sentence meaning combinations that are the most matched with a current interpreted statement as interpretation options for selection in an interpretation process of a Dongba pictograph character; by taking the word meaning database as an example, frequent pattern mining is performed by adopting an FP-growth algorithm as follows:

(1) scanning the word meaning database, finding out frequently used word meanings and use times, making a list L of frequent items, ranking the frequent items in a progressive decrease order according to the use times;

(2) scanning the database again, continuously constructing an FP-Tree from each word meaning: setting a root node of the FP-Tree as null; adding each word meaning item to branches of the FP-Tree one by one;

(3) making a head node list, linking all same items together;

(4) finding out a path ended with a certain word meaning, i.e., a suffix pattern of a word meaning, according to the head node list;

(5) a prefix path of the word meaning forming a conditional pattern base of the word meaning;

(6) constructing a conditional FP-tree of the word meaning according to the conditional pattern base to obtain a conditional frequent item set;

(7) merging the conditional frequent item set with the suffix pattern of the word meaning to obtain a frequent item set of the word meaning.

8. The method for establishing a digitalized interpretation base of Dongba classic ancient books according to claim 1, characterized in that: in the step 4), a method for clustering analysis is as follow:

(1) using a number of events in the event database as a category number of clustering analysis, using information about event codes, event names, categories, event contents and picture codes as source data, calculating clustering centers of events by adopting a fuzzy C-means method;

(2) using information about word meaning codes, picture codes, corresponding Chinese characters, categories and Chinese meanings in the word meaning database corresponding to two continuous word meanings in an interpretation process as samples, calculating a membership degree that the samples belong to a certain clustering center;

(3) using an event corresponding to the membership degree with a maximum numerical value as an implicit event of the word meaning, outputting an association relationship between word meanings and events to the interpretation knowledge base to improve the fusion method in the interpretation knowledge base.

* * * * *